United States Patent Office 3,113,867
Patented Dec. 10, 1963

3,113,867
MOTION-PICTURE FILM LACQUER
Gilden R. Van Norman and Richard H. Wagner, Rochester, N.Y., assignors to Eastman Kodak Company, Rochester, N.Y., a corporation of New Jersey
No Drawing. Filed Oct. 29, 1959, Ser. No. 849,465
5 Claims. (Cl. 96—87)

This invention concerns a motion-picture film lacquer, more particularly a quaternary polymer composition for use in a motion-picture film lacquer.

Due to the nature of photographic film and uses that are made of it, it has been found that handling tends to produce scratches and other abrasions. Moreover, the photographic film is subject to fingerprinting, smudging from various lubricating oils, skin oils, etc. These are particularly noticeable in so-called miniature camera film which is passed through automatic printing devices, and in motion picture film which is caused to move through mechanical and manual devices, past foreign surfaces and over other portions of its own surface. Moreover, film base may become brittle and tend to crack or deteriorate.

For these reasons, motion picture film is often lacquered using some type of film lacquer which is water resistant and which protects the film surface from water spotting, abrasions and the like. In addition, a lubricant is normally incorporated in the film lacquer to provide flexibility and to facilitate movement of the film through the film passing parts of the projector.

In many of the film lacquers which have been used, a film forming resin and a lubricant are the two basic constituents. This lubricant has been either one of two types, the fatty acid derivatives of pentaerythritol or the natural waxes such as paraffins. In some instances, however, the type of lubricant has introduced difficulties in coating and formulation. For instance, an additive of this type may cause a softening of the coating through plasticizing action or may exude through the film forming component, accumulating on the surface as an oily layer. This phenomena can often lead to ferrotyping of the coatings in rolls which have been wound under tension. The ferrotyping marks and the exudation layer may be detected in prints made from the lacquered negatives and consequently requires removal of the lacquer before prints can be made.

We have discovered a quaternary copolymer film lacquer composition which is removable in alkaline developing baths and which includes a lubricant which is part of the quaternary polymer.

One object of this invention is to provide a transparent protective layer for photographic elements such as film, paper, glass and the like. Another object of this invention is to provide a water-insoluble lacquer for photographic elements removable in alkaline developing solutions. A further object of this invention is to provide a transparent protective layer which can resist abrasions, fingerprints, etc. without permitting the photographic image itself to be damaged. Another object is to provide such a protective layer which is readily removable so that when it has become undesirably damaged it can be removed and replaced with a fresh protective layer. Another object is to provide a smooth, transparent layer which can be applied to already scratched and abraded photographic film, in order to minimize the effect of such damage.

A further object is to provide a process of applying a protective coating to photographic film which can be economically integrated with the usual operations of photographic film manufacture, processing, and the like. An additional object is to provide a water-insoluble coating which can be a vehicle for ultraviolet absorbers. A further object is to provide a transparent protective layer which will have desirable slip and scratch resistance. Another object is to provide a protective layer which will shield the photographic image from the attack of fungi and other micro-organisms, and which will keep dust, dirt, and contaminants physically separated from the delicate photographic image.

The above objects are attained by polymerizing methacrylic acid, methyl acrylate, methyl methacrylate and stearyl methacrylate to form a quaternary polymer. The following proportions provide a film coating having good adhesion to film support and emulsion, possessing a good degree of abrasion resistance and removable by alkaline developers and inexpensive primary alcohols.

|  | Percent by weight |
|---|---|
| Methacrylic acid | 30–45 |
| Methyl acrylate | 1–50 |
| Methyl methacrylate | 10–60 |
| Stearyl methacrylate | 5–8 |

Solvents which may be used include lower aliphatic alcohols, lower aliphatic ketones, lower aliphatic esters of lower organic acids, Cellosolve derivatives, and dioxane. Non-solvents may also be present in the solvent mixture.

Applications of this lacquer may be made to photographic elements which are dry. In a typical embodiment of my invention the lacquer will be applied to photographic elements following processing, and after the drying operation. With miniature camera film or so-called roll films, for example, such processing might be done on a processing machine, with a lacquer-containing tank at the end following the drying section. During manual processing the film would be immersed in a tray of the lacquer after washing and after drying. With motion picture film the photographic processing will usually be done on a continuous machine and the lacquer may be applied after drying.

The quaternary polymer may be used as a developer-removable layer over certain types of photographic emulsions to alleviate sticking when the film is exposed to sea water as it may be in military and space exploration applications. The lacquer may be used on photographic elements such as colored negatives, colored slides and the like as an abrasion-resistant coating.

Another embodiment is the application of this lacquer to unexposed and/or unprocessed films for protection of the emulsion surface; such a protective coating would automatically be removed in the developing solutions, permitting normal development of the light-sensitive emulsion. A still further embodiment is the treating of scratched films by reprocessing, through photographic developing and fixing solutions (which has a cleaning action in removing surface dirt and dirt imbedded in scratches) washing, drying and applying the lacquer as above in order to minimize the seriousness of the scratches and damage. Photographic elements which have been lacquered may be cleaned by the removal of the lacquer in dilute alkali, facilitating the reapplication of an unblemished lacquer coat.

In the event that a formulation is desired for other purposes such as use as an anti-static backing, the stearyl methacrylate component may be omitted. The coatings may be made of the copolymer in a latex form as a dry over-coating on the emulsion in conjunction with the salt form as a backing.

The following examples will serve to show the preparation of the resin constituent and its use, but does not preclude the use of other soaps, catalysts, terminators and reaction media lying within the scope of any one skilled in the art of polymer preparation.

*Example 1*

In a 1000 ml. fluted, round-bottom, three necked flask, equipped with a variable speed stirrer, was placed 400 ml. of distilled water. To the water was added 2.0 g. of potassium persulfate and 2.4 g. of Duponol ME. The flask and stirrer were suspended in a water bath thermostatted at 80° C.

A solution was prepared containing 42 g. of methacrylic acid (distilled), 12 g. of methyl acrylate (free of inhibitor), 66 g. of methyl methacrylate, 8 g. of stearyl methacrylate, and 1.3 g. of 1-dodecanethiol. This solution was added dropwise to the water solution over a period of 45 minutes. The stirring was continued for 30 minutes after addition was completed.

The quaterpolymer was isolated by pouring the hot latex into a hot (80° C.) aqueous solution of aluminum sulfate (5%). The supernatant liquid was decanted and the quaterpolymer was rewashed three times with cold tap water. After isolation, the quaterpolymer was dried for 16 hours at 125° F. The yield was essentially quantitative.

A polymer prepared according to the above procedure was found to be soluble in the lower aliphatic alcohols, Cellosolve derivatives, dioxane and 5% sodium carbonate solutions. Solution may be obtained also with the above solvents in conjunction with other organic solvents such as lower aliphatic esters, ketones and with aromatic hydrocarbons. The effect of solvents too active for film support may be minimized by the addition of non-solvents. The polymer was insoluble in all other common organic solvents such as toluene, benzene, and the like. After formulation in a lacquer, satisfactory coatings were prepared using a number of quaterpolymeric-containing lacquers.

*Example 2*

Into a 1000 ml. fluted, round bottom, three-necked flask, equipped with a variable speed stirrer, was placed 400 ml. of distilled water. To this was added 2.0 g. of C.P. potassium persulfate and 2.4 g. of Duponol ME. The flask was suspended in a water bath thermostatted at 80° C.

A solution was prepared containing 48 g. of methacrylic acid (distilled), 12 g. of methyl acrylate (free of inhibitor), 60 g. of methyl methacrylate (free of inhibitor), 2.2 g. of 1-dodecanethiol. This solution was added to the water solution dropwise over a period of 45 minutes. The stirring was continued for 30 minutes after the addition was completed.

The terpolymer was isolated by pouring the hot latex into a hot (80° C.) aqueous solution of 5 percent C.P. aluminum sulfate. The supernatant liquid was decanted and the terpolymer was rewashed three times with cold tap water. After isolation, the terpolymer was dried for sixteen hours at 125° F.

Coatings on motion picture film required an added lubricant. However, the coatings without a lubricant were useful as antihalation layers and as carriers for antistatic agents.

Tests run on samples of photographic film indicate that the treated films are considerably superior to untreated film in their resistance to abrasive action. For instance, strips were run through a rapid type printer and compared with uncoated check strips which showed greater damage as a result of the printing operation. Haze measurements indicate quite definitely that the lacquered materials were more resistant to abrasion than untreated controls. The treated film is found resistant to fingerprinting; usually the fingerprint is removable by wiping with a dry cloth or a cloth moistened with carbon tetrachloride or other film cleaning solvent; in severe cases the lacquer can be removed by reprocessing the film through normal alkaline developer, or rinsing in dilute alkali of pH between 8.0 and 12.0, followed by a water rinse, drying, the reapplication of the lacquer—this renewal is almost invariably sufficient to eliminate the most stubborn fingerprints.

Tests of micro-biological resistance wherein treated film is exposed to conditions of high humidity etc. favoring the growth of micro-organisms in both accelerated tests and in tropic regions, have shown the treated film to resist solubilization of the photographic emulsion and obliteration or destruction of the photographic image under conditions in which untreated films are rendered useless in relatively short times.

A fungicide may be added such as pentachlorophenol. Pentachlorophenol is a well known fungicide and preservative, which aids in attaining high resistance to microbiological organisms in the final lacquer coatings. Up to .001% may be added. Various mercurials, copper naphthenates, and other fungicides and preservatives may be substituted when desired, so long as they are compatible.

The insolubilization of the lacquer is a time-temperature relationship and proceeds more rapidly as the temperature is increased. However, even at room temperature this is a fast drying lacquer.

Ultraviolet absorbers which may be used depend upon their compatibility and solubility in the desired solvents. Such compounds include, 2,2'-dihydroxy-4,4'-dimethoxybenzophenone, 2,2'-dihydroxy-benzophenone, sodium-($\alpha$-phenylhydrazone)-$\alpha,\beta$-diketo-butyrate, Thioflavine S, derivatives of $\alpha$-methyl-$\alpha$-phenyl hydrazine, and the like.

This composition has the advantage over other lacquer resins in that the starting materials always have the same composition and the polymers may be reproduced within very narrow specifications.

Film coatings using our lacquer may be cleaned with such solvents as methyl chloroform, a solvent in which the cellulose type film lacquers may be removed.

We claim:

1. A photographic product comprising a support member, a photographic emulsion, and superimposed upon at least one surface thereof a protective coating of a quaternary polymer prepared by polymerizing a monomeric mixture having the following composition:

| | Percent, by weight |
|---|---|
| Methacrylic acid | 30–45 |
| Methyl acrylate | 1–50 |
| Methyl methacrylate | 10–60 |
| Stearyl methacrylate | 5–8 |

2. A process for rejuvenating scratched photographic film comprising coating the film with a quaternary polymer prepared by polymerizing a monomeric mixture having the following composition:

| | Percent, by weight |
|---|---|
| Methacrylic acid | 30–45 |
| Methyl acrylate | 1–50 |
| Methyl methacrylate | 10–60 |
| Stearyl methacrylate | 5–8 | reprocessing, washing, and drying the photographic film.

3. A photographic product comprising a support member, a photographic emulsion, and superimposed upon at least one surface thereof a protective coating of the polymer having the following approximate composition by weight: methacrylic acid 38%, methyl acrylate 9%, methyl methacrylate 48% and stearyl methacrylate 5%.

4. The product of claim 1 wherein the coating is superimposed on the emulsion surface.

5. The product of claim 1 wherein the coating is superimposed on the surface of the support opposite to the emulsion layer.

References Cited in the file of this patent

UNITED STATES PATENTS

| | | |
|---|---|---|
| 2,341,461 | Matthews et al. | Feb. 8, 1944 |
| 2,494,054 | Nadeau et al. | Jan. 10, 1950 |
| 2,588,318 | Beningus | Mar. 4, 1952 |
| 2,633,423 | Bower et al. | Mar. 31, 1952 |
| 2,717,834 | Saner | Sept. 13, 1955 |
| 2,772,252 | Briskin et al. | Nov. 27, 1956 |
| 2,757,106 | Brown et al. | July 31, 1956 |
| 2,778,283 | Bettoli et al. | Jan. 22, 1957 |
| 2,882,261 | Marks | Apr. 14, 1959 |
| 2,951,052 | Darby | Aug. 30, 1960 |
| 2,957,854 | Lorensen | Oct. 25, 1960 |
| 3,011,988 | Luedke et al. | Dec. 5, 1961 |
| 3,025,181 | Nuessle et al. | Mar. 13, 1962 |